United States Patent
Trabold et al.

(10) Patent No.: US 6,916,573 B2
(45) Date of Patent: Jul. 12, 2005

(54) PEM FUEL CELL STACK WITHOUT GAS DIFFUSION MEDIA

(75) Inventors: Thomas A. Trabold, Pittsford, NY (US); Michael R. Schoeneweiss, W. Henrietta, NY (US)

(73) Assignee: General Motors Corporation, Detroit, MI (US)

(*) Notice: Subject to any disclaimer, the term of this patent is extended or adjusted under 35 U.S.C. 154(b) by 131 days.

(21) Appl. No.: 10/201,828

(22) Filed: Jul. 24, 2002

(65) Prior Publication Data

US 2004/0018413 A1 Jan. 29, 2004

(51) Int. Cl.$^7$ ................................................ H01M 8/04
(52) U.S. Cl. ............................ 429/39; 429/34; 429/38
(58) Field of Search ............................. 429/34, 40, 42, 429/41, 38, 39

(56) References Cited

U.S. PATENT DOCUMENTS

| | | | |
|---|---|---|---|
| 3,134,697 A | | 5/1964 | Niedrach |
| 4,485,387 A | | 11/1984 | Drumheller |
| 5,211,984 A | * | 5/1993 | Wilson ........................ 427/115 |
| 5,272,017 A | | 12/1993 | Swathirajan et al. |
| 5,316,871 A | | 5/1994 | Swathirajan et al. |
| 5,441,822 A | * | 8/1995 | Yamashita et al. ............ 429/34 |
| 5,707,755 A | * | 1/1998 | Grot ............................ 429/40 |
| 6,074,692 A | * | 6/2000 | Hulett ........................ 427/115 |

OTHER PUBLICATIONS

Kirk Othmer Encyclopedia "Fluorine containing Polymers, Polytetrafluoroethylene", John Wiley & Sons, 1994.*

Trabold et al., "High Pressure Annular Two–Phase Flow in a Narrow Duct: Part I–Local Measurements in the Droplet Field", ASME, 122, Jun. 2000.

Wilson, et al., "Thin–film catalyst layers for polymer electrolyte fuel cell electrodes," Electronics Research Group, Los Alamos National Laboratory, Feb. 1991.

* cited by examiner

*Primary Examiner*—Carol Chaney
(74) *Attorney, Agent, or Firm*—Harness, Dickey & Pierce, P.L.C.

(57) ABSTRACT

A fuel cell comprising an ionically conductive member with a first surface and a second surface. An anode electrode is disposed on the first surface of the ionically conductive member and a cathode electrode is disposed on the second surface of the ionically conductive member. A first electrically conductive fluid distribution element is disposed on the anode and a second electrically conductive fluid distribution element is disposed on the cathode. The first and second electrically conductive fluid distribution elements each include a plurality of alternating lands and fluid passages. The anode and the cathode are comprised of a plurality of electrochemically active regions that are disposed to essentially align with the fluid passages.

26 Claims, 6 Drawing Sheets

Examples of MicroPen Technique for Applying Coatings of Various Thicknesses and Widths

PEM FUEL CELL STACK WITHOUT GAS DIFFUSION MEDIA

FIELD OF THE INVENTION

The present invention relates to PEM fuel cells and more particularly to such cells wherein an electrochemically active material is disposed as a plurality of regions that are correspondingly aligned with fluid passages of an electrically conductive fluid distribution element in order to enable the elimination of gas diffusion media from the fuel cell.

BACKGROUND OF THE INVENTION

Fuel cells have been proposed as a power source for electric vehicles and other applications. One such fuel cell is the PEM (i.e. Proton Exchange Membrane) fuel cell that includes a so-called "membrane-electrode-assembly" (MEA) comprising a thin, solid polymer membrane-electrolyte having a pair of electrodes (i.e., an anode and a cathode) on opposite faces of the membrane-electrolyte. The MEA is sandwiched between a pair of electrically conductive fluid distribution elements (i.e., bipolar plates) which serve as current collectors for the electrodes, and contain a so-called "flow field" which is an array of lands and grooves formed in the surface of the plate contacting the MEA. The lands conduct current from the electrodes, while the grooves between the lands serve to distribute the fuel cell's gaseous reactants evenly over the faces of the electrodes. Gas diffusion media, which are typically porous graphite/carbon paper, are positioned between each of the electrically conductive fluid distribution elements and the electrode faces of the MEA, to support the MEA where it confronts grooves in the flow field, and to conduct current therefrom to the adjacent lands.

The gas diffusion media heretofore interposed between the electrodes and their associated electrode plates have drawbacks, however. Gas diffusion media usually comprise a mat of randomly oriented fibers that are typically about 10 mils thick, and are quite expensive. Gas diffusion media also impede diffusion of the $H_2$ and $O_2$ to their respective electrodes, require that considerable pressure be applied to ends of the cell/stack to provide a good conductive interface with the electrodes and thereby reduce cell impedance, and impede the outflow of water from the MEA.

Of the above drawbacks, the phenomenon of impeding the outflow of water from the MEA, often referred to as "flooding" is particularly troublesome. Flooding can hinder a fuel cell's operation at low current density when the air flow through the cathode flow field plate is not sufficient to drive the water removal process. Excess liquid water also tends to plug the pores in gas diffusion media, and thereby isolate the catalytic sites from the reactant oxygen flow. Therefore, there is a need for an improved fuel cell design to minimize the aforesaid drawbacks.

SUMMARY OF THE INVENTION

With the above deficiencies in mind, the present invention provides a fuel cell comprising an ionically conductive member with a first surface and a second surface. An anode electrode is disposed on the first surface of the ionically conductive member and a cathode electrode is disposed on the second surface of the ionically conductive member. A first electrically conductive fluid distribution element faces the anode and a second electrically conductive fluid distribution element faces the cathode. The first and second electrically conductive fluid distribution elements each include a plurality of alternating lands and fluid passages. The anode and the cathode are comprised of a plurality of electrochemically active regions that are arranged to essentially align with the fluid passages.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
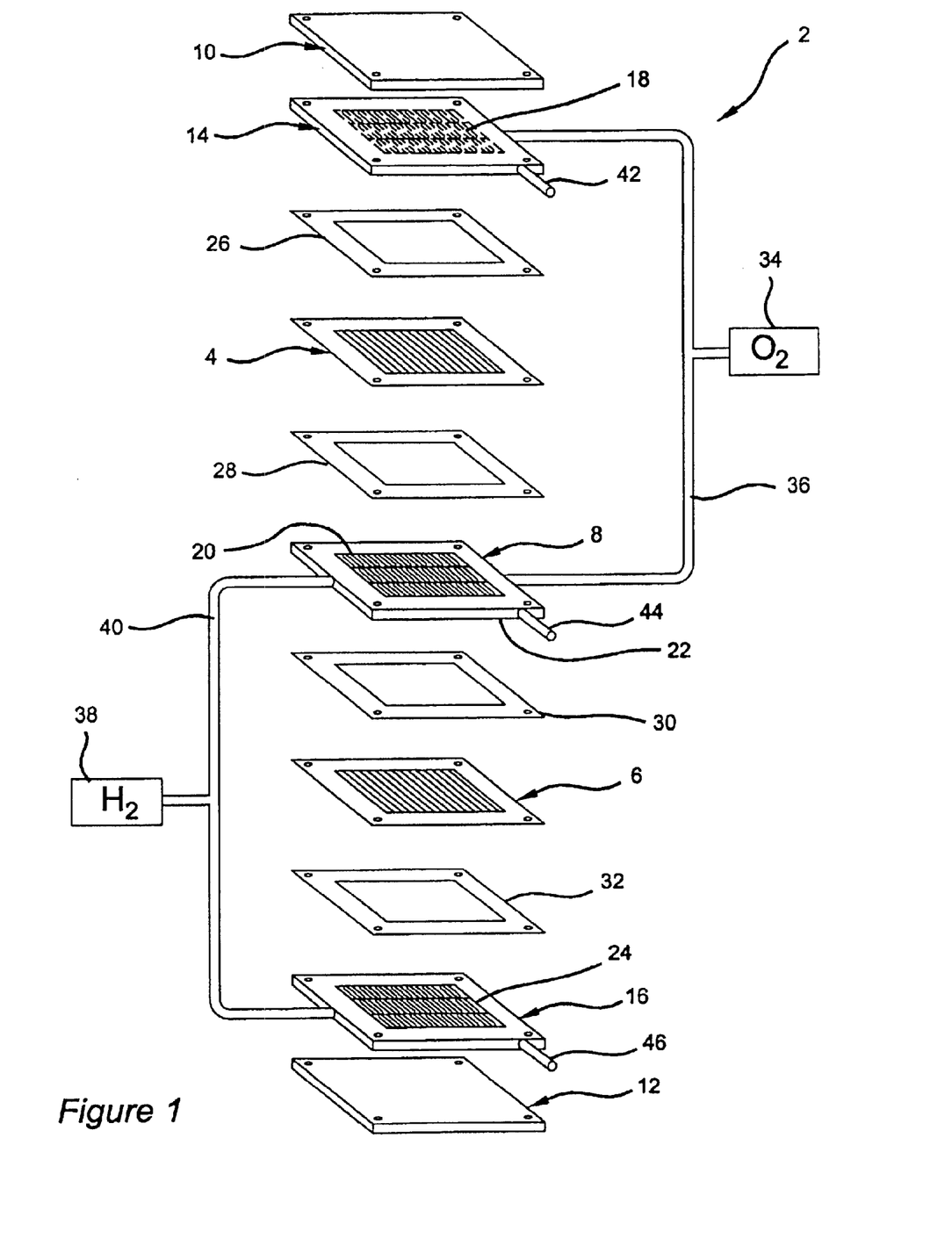
FIG. 1 is a schematic, exploded illustration of a PEM fuel cell stack (only two cells shown) according to the present invention.

FIG. 1 depicts a two cell, bipolar fuel cell stack 2 having a pair of membrane-electrode-assemblies (MEAs) 4 and 6 separated from each other by an electrically conductive fluid distribution element 8, hereinafter bipolar plate 8. The MEAs 4 and 6 and bipolar plate 8, are stacked together between stainless steel clamping plates, or end plates 10 and 12, and end contact elements 14 and 16. The end contact elements 14 and 16, as well as both working faces of the bipolar plate 8, contain a plurality of grooves or channels 18 (shown in phantom), 20, 22, and 24, respectively, for distributing fuel and oxidant gases (i.e. $H_2$ and $O_2$) to the MEAs 4 and 6. Nonconductive gaskets 26, 28, 30, and 32 provide seals and electrical insulation between the several components of the fuel cell stack. Oxygen is supplied to the cathode side of the fuel cell stack from storage tank 34 via appropriate supply plumbing 36, while hydrogen is supplied to the anode side of the fuel cell from storage tank 38, via appropriate supply plumbing 40. Alternatively, ambient air may be supplied to the cathode side as an oxygen source and hydrogen to the anode from a methanol or gasoline reformer, or the like. Exhaust plumbing (not shown) for both the $H_2$ and $O_2$ sides of the MEAs 4 and 6 will also, typically, be provided. Additional plumbing 42, 44, and 46 is provided for supplying liquid coolant to the bipolar plate 8 and end contact elements 14 and 16. Appropriate plumbing for exhausting coolant from the bipolar plate 8 and end contact elements 14 and 16 is also provided, but not shown.

Figure 2:
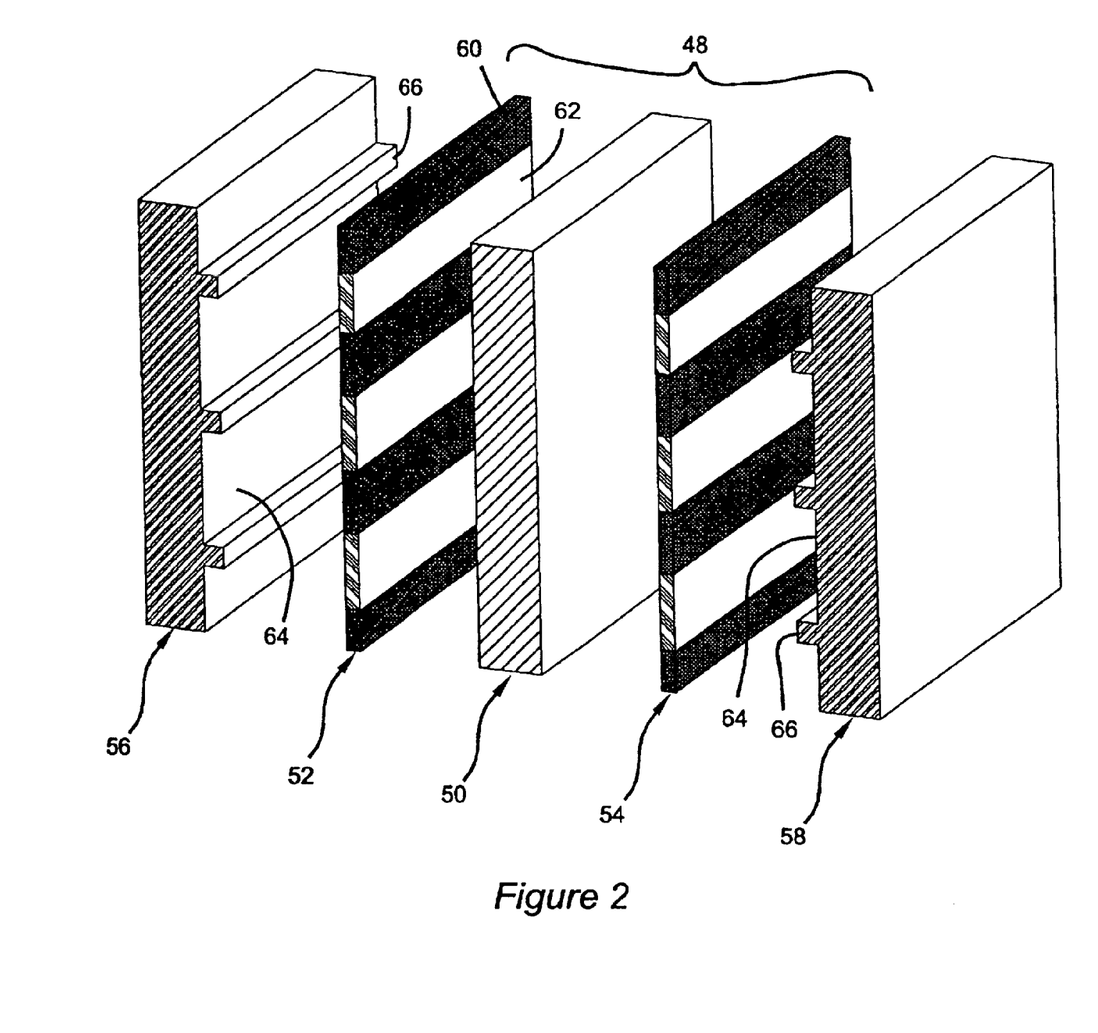
FIG. 2 is an enlarged, exploded view of a fuel cell according to a first embodiment of the present invention.

FIG. 2 is an enlarged, exploded view of various components of a fuel cell according to a first embodiment of the present invention. As can be seen in FIG. 2, the fuel cell comprises a membrane electrode assembly (MEA) 48 that includes an ionically conductive member 50 sandwiched by an anode electrode 52 and a cathode electrode 54. The MEA 48 is further sandwiched by an anodic surface bipolar plate 56 and a cathodic surface bipolar plate 58.

The ionically conductive member 50 is preferably a solid polymer membrane electrolyte, and more preferably a PEM. Polymers suitable for such membrane electrolytes are well known in the art and are described in U.S. Pat. Nos. 5,272,017 and 3,134,697 and elsewhere in the patent and non-patent literature. It should be noted, however, that the composition of the ionically conductive member 50 may comprise any of the proton conductive polymers conventionally used in the art. Preferably, perfluorinated sulfonic acid polymers such as NAFION® are used. Furthermore, the polymer may be the sole constituent of the membrane or may be carried in the pores of another material.

In accordance with the present invention, the anode electrode 52 and the cathode electrode 54 are comprised of a plurality of electrochemically active regions 60. These electrochemically active regions 60 are illustrated as, but are not limited to, a plurality of stripe-shaped regions (shown) or a plurality of dot-shaped regions (not shown). The electrochemically active regions 60 are separated from one another by a plurality of adjacently disposed electrically conductive regions 62.

The composition of the electrochemically active regions 60 may be any electrochemically active material conventionally used in the art. In this regard, the electrochemically active regions 60 preferably comprise catalyst-coated carbon or graphite particles embedded in a polymer binder which, like the polymer membrane, is a proton conductive material such as NAFION®. The electrochemically active region 60 will preferably include platinum as the catalyst. With respect to the electrically conductive regions 62, it is preferable to utilize carbon or graphite particles embedded in a polymer binder such as NAFION®.

The anodic surface bipolar plate 56 and the cathodic surface bipolar plate 58 may be any bipolar plate known in the art. Preferable materials for use as the bipolar plates include steel, aluminum, titanium, a composite material, or a polymeric material. The composite material may further include carbon fibers, graphite fibers, steel fibers, or any other electrically conductive material which facilitates electrical conductivity. Furthermore, it is not out of the scope of the present invention to coat the bipolar plates with a coating such as a noble metal, titanium, aluminum, or the like which also assists in facilitating electrical conductivity and may further assist in corrosion resistance.

Figure 3:
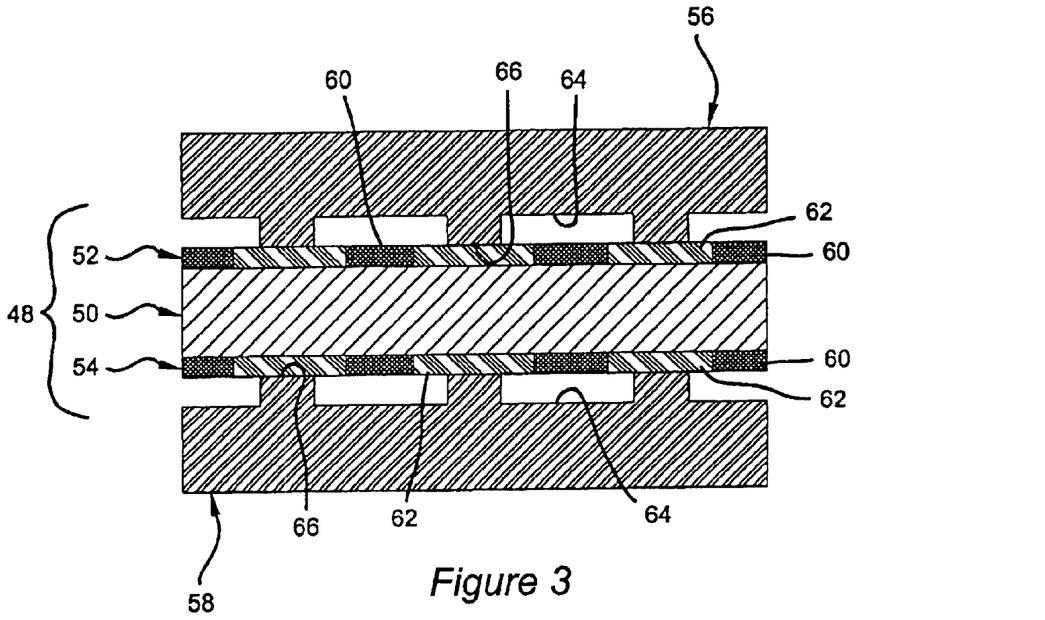
FIG. 3 is an enlarged, sectional view of a cell according to a first embodiment of the present invention.

In the first embodiment of the present invention, the electrochemically active regions 60 of the anode 52 and cathode 54 are formed in a stripe pattern that preferably correspond to or align with the channels or passages 64 of the bipolar plates 56 and 58 which is more clearly depicted in FIG. 3. In one embodiment, the electrochemically active regions 60 are preferably formed to widths that are less than widths of the channels 64 of the bipolar plates 56 and 58, and more preferably to widths that are less than half the widths of the channels 64 so that the channels 64 encompass or circumscribe the electrochemically active regions 60. This facilitates a simplified manufacturing process as the precise alignment of the electrochemically active regions 60 with the channels 64 of the bipolar plates 56 and 58 is not required. Furthermore, the deposition of the electrochemically active regions 60 in a stripe pattern reduces the overall cost of the MEA 48 and fuel cell in that a smaller amount of the expensive platinum catalyst is used as compared to a continuous electrode.

As can also be seen in FIG. 3, the lands 66 of the bipolar plates 56 and 58 directly contact the electrically conductive regions 62 of the anode 52 and cathode 54. When a fuel stream of pure $H_2$ or hydrogen reformate is dispersed over the electrochemically active regions 60 of the anode 52, electrons that are produced by the hydrogen oxidation reaction are laterally conducted a short distance through the electrochemically active regions 60 to the adjacently disposed electrically conductive regions 62. Since the lands 66 of the bipolar plate 56 directly contact the electrically conductive regions 62 of the anode 52, electrical conductivity is facilitated and enhanced. Protons ($H^+$) produced from the anodic reaction, combined with water from the humid fuel stream pass through the electrochemically active regions 60 to the PEM 50 and through to the cathode 54.

A stream of $O_2$ or ambient air that contains oxygen is dispersed over the electrochemically active regions 60 of the cathode 54. The oxygen undergoes a reduction reaction and the electrons that are produced are also laterally conducted a short distance through the electrochemically active regions 60 to the adjacent electrically conductive regions 62. The reduced oxygen then reacts with the protons from the anode 52 and liquid water is produced.

It should be understood that since the electrochemically active regions 60 essentially correspond to or align with the channels 64 and have widths less than the widths of the channels 64, water produced from the electrochemical reaction of the fuel cell will preferentially not form on the lands 66 and will essentially be confined to the channels 64. Accordingly, the water in the channels 64 the water is in contact with the high velocity air stream which will convectively remove the water from the fuel cell.

A unique aspect of the present invention one skilled in the art would readily appreciate is that the electrically conductive regions 62 that are adjacently disposed to the electrochemically active regions 60 of the anode 52 and cathode 54 also function as a thermally conductive material. By functioning as a thermally conductive material in addition to an electrically conductive material, heat produced during the electrochemical reactions of the fuel cell can be transferred more effectively and efficiently from the active regions to the lands.

Figure 4:
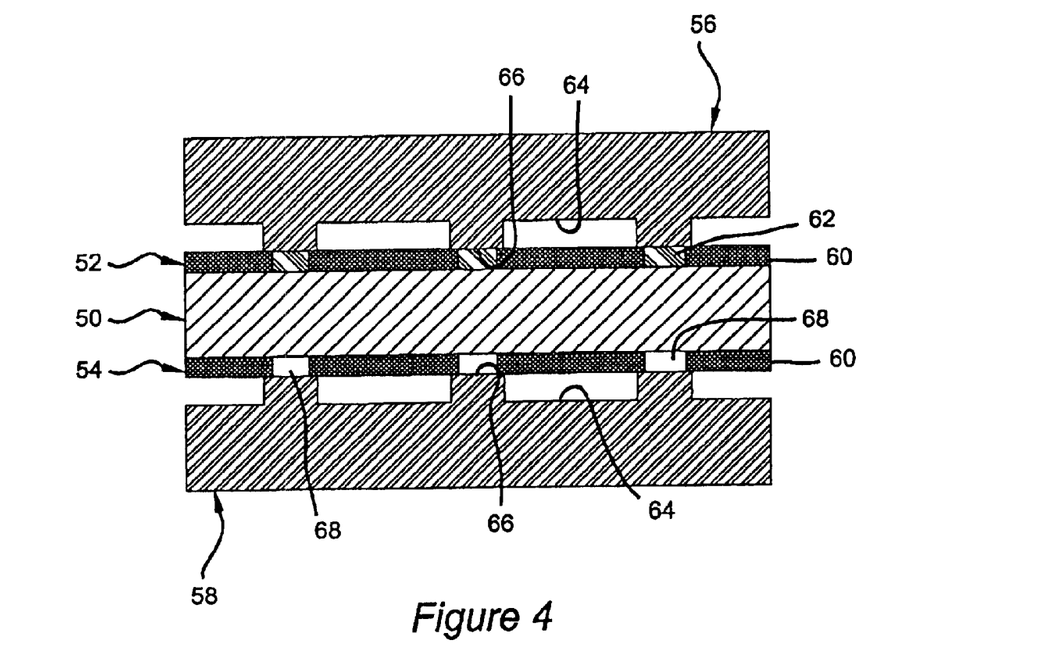
FIG. 4 is an enlarged, sectional view of a cell according to a second embodiment of the present invention.

In a second embodiment of the present invention as shown in FIG. 4, the electrochemically active regions 60 of the anode 52 and cathode 54 are formed to widths greater than the widths of the channels 64 of the bipolar plates 56 and 58. Disposing the electrochemically active regions 60 to widths greater than the widths of the channels 64 also facilitates a simplified manufacturing process as the precise alignment of the electrochemically active regions 60 with the channels 64 of the bipolar plates 56 and 58 is not required. Furthermore, disposing the electrochemically active regions 60 to widths greater than the widths of the channels 64 of the bipolar plates 56 and 58 increases the reaction area for the anodic and cathodic reactions to occur which, in turn, enables a greater current density to be produced.

It should be noted that although the electrochemically active regions 60 for both the anode 52 and cathode 54 are shown to be essentially equal in widths, the present invention should not be limited thereto. In order to maintain a satisfactory current density, however, it is preferable that the widths of the electrochemically active regions 60 are essentially equal for both the anode 52 and cathode 54.

Returning to the first embodiment, electrons produced from the anodic and cathodic reactions are laterally conducted a short distance through the electrochemically active regions 60 to the electrically conductive regions 62 which then conduct the electrons to the bipolar plates 56 and 58. The lateral conduction of electrons also takes place in the second embodiment. However, as can be seen in FIG. 4, the electrochemically active regions 60 of the anode 52 and cathode 54 directly contact the bipolar plates 56 and 58 which facilitates the conduction of electrons directly from the electrochemically active regions 60 to the bipolar plates 56 and 58.

As the electrochemically active regions 60 are enlarged to widths that are larger than the widths of the channels 64 in order to contact the lands 66 to facilitate the conductivity of electrons, the reaction area also increases between the electrochemically active regions 60 and the feed streams of the anode 52 and cathode 54. As such, a higher current density is produced due to the larger production of electrons in the oxidation and reduction reactions, but more water is produced as well which may flood the fuel cell. Therefore it may be desirable to form void spaces in the electrically conductive regions 62 adjacent the electrochemically active regions 60 to assist in the removal of excess water. Thus, some or all of regions 62 may be removed resulting in void or open areas 68.

As shown in FIG. 4, the electrically conductive regions 62 of the cathode 54 have been removed to reveal open areas or holes 68. As such, these holes 68 provide additional paths for water to leave the fuel cell, especially when the fuel cell has a vertical orientation, which is preferable but should not be limited to. When the fuel cell has a vertical orientation (not shown), gravity assists in the removal of water through the holes 68.

It should be noted that in FIG. 4 only the electrically conductive regions 62 of the cathode 54 have been removed. This is because water is formed on the cathodic surface of the MEA during the electrochemical reaction of the fuel cell and requires a greater need for water removal. Although it is preferable to remove only the electrically conductive regions 62 of the cathode, the present invention should not be limited thereto as it may be desirable to remove the electrically conductive regions 62 of the anode 52 as well. By removing the electrically conductive regions 62 from the anode 52, the humid fuel stream acts as a humidifier that properly hydrates the PEM 50. A properly hydrated PEM 50 is critical for the transfer of protons to the cathode 54.

Figure 5:
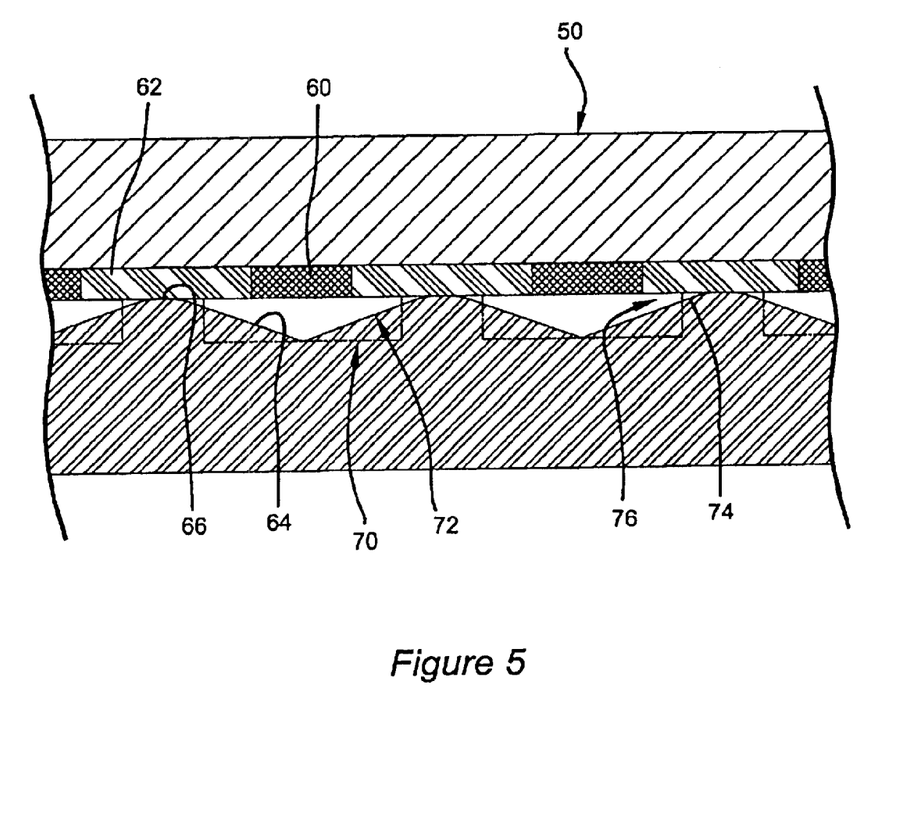
FIG. 5 is an enlarged, sectional view according to a third embodiment of the present invention.

In a third embodiment of the invention shown in FIG. 5, in order to further facilitate the electrochemical reaction and improve the convective removal of water from the fuel cell, the channels 64 of bipolar plates 56 and 58 may include a modified geometry. As illustrated in FIG. 5, the cross-section of the channels 64 may be altered from a rectangular shape 70 (shown in phantom) to a triangular shape or V-shape 72. More specifically, edges or sidewalls 74 of the channels 64 are tapered or ramped upwards toward the MEA 48 such that an acute angle is formed between the MEA 48 and the edges 74.

Employing the modified geometry illustrated in FIG. 5 will essentially halve the flow area and, in effect, essentially double the gas velocity of the feed stream. Increasing the velocity of the feed stream increases the amount of reactant gases that come into contact with the electrochemically active regions 60, and under appropriate conditions increases the rate of the electrochemical reaction, and as a result, the current density. Furthermore, because the gas diffusion media is not required to be used, there will be no gas flow across the lands 66 of the bipolar plates 56 and 58 through the gas diffusion media. This will further increase the gas velocity than in current stack designs. It should be noted, however, that although the invention is described in a preferred embodiment without the use of intermediate material such as gas diffusion media between the MEA and the bipolar plate, it is possible to include an intermediate element such as screen, cloth or foam for purposes such as support, conductivity, or dispersion.

Returning to the shape of channels 64, as the electrochemical reaction rate increases, more water will be produced. As such, the increased velocity of the feed stream through the channels 64 also will assist in convectively removing the water from the fuel cell. Another aspect of the modified triangular cross-section 72, is that edges 74 of the channels 64 can be curved or contoured to provide low velocity zones 76 for accumulation of liquid water away from the electrochemically active regions 60 of the MEA 48 surface.

It is known from two-phase flow literature that continuous liquid will tend to accumulate in the lowest velocity zones as is described in "High Pressure Annular Two-Phase Flow in a Narrow Duct: Part I-Local Measurements in the Droplet Field", ASME, 122, June 2000, by Trabold et al. As such, by contouring the edges 74 of the channels 64, the low velocity zones 76 will develop. As can be seen in FIG. 5, the low velocity zones 76 are located away from the electrochemically active regions 60 of the cathode 54 so that water produced by the electrochemical reaction will accumulate away from the electrochemically active regions 60, thereby enabling the reactant gases to reach the catalytic areas of the electrochemically active regions 60. Furthermore, the elimination of the sharp-edged interface between the flow field plate and MEA will have additional durability benefits as a stress concentration point that may damage the MEA will no longer be present.

Figure 6:
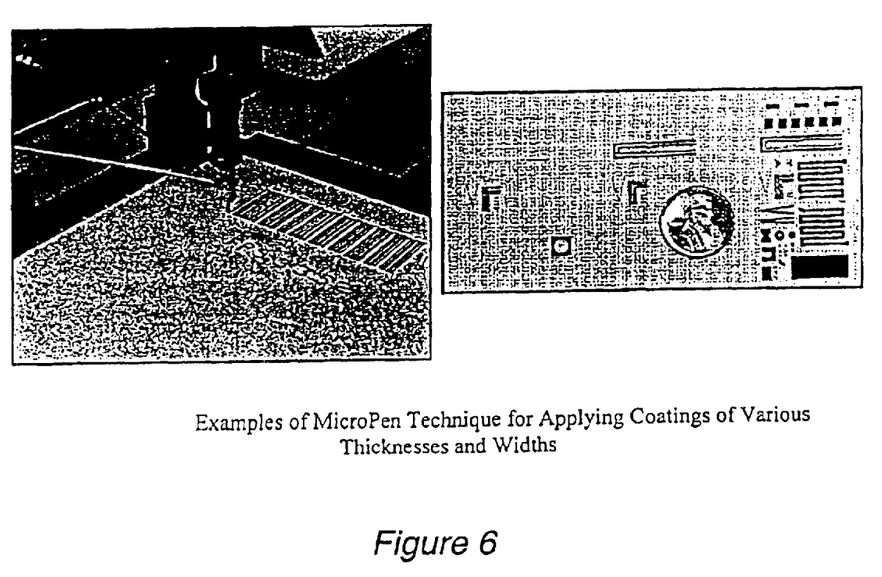
FIG. 6 is a photograph depicting an example of the direct writing technique used in accordance with the present invention.

It should be understood that the above described embodiments of the present invention are enabled by the deposition of the electrochemically active material as a plurality of electrochemically active regions such as stripe-shaped regions or dot-shaped regions. In order to deposit the electrochemically active material as a plurality of regions 60, a direct writing technique is preferably employed, but should not be limited to. Direct writing is described in U.S. Pat. No. 4,485,387 to Drumheller and an example of direct writing is shown in FIG. 6. A manufacturer of a device capable of the direct writing technique is MicroPen, Inc., which is a subsidiary of Ohmcraft, Inc. in Honeoye Falls, N.Y.

The direct writing technique employs a device with a thin nozzle tip to apply fluids over a wide range of viscosities to a variety of widths and thicknesses. For example, lines with widths ranging from about 0.001" to 0.080" (1 mil to 80 mils or 0.025 mm to 2.0 mm) and thicknesses ranging up to about 0.010" (10 mils or 0.25 mm) can be achieved with such a technique. Preferably, widths of the electrochemically active regions 60 are at least half the width or up to about 1.25 times the width of the corresponding channels 64 of the bipolar plates 56 and 58. Widths of the channels 64 are preferably in the range of about 0.01" to 0.120" (10 mils to 120 mils or 0.25 mm to 3.0 mm), and more preferably in the range of about 0.02" to 0.06" (20 mils to 60 mils or 0.50 mm to 1.5 mm). As such, widths of the electrochemically active material 60 are preferably in the range of about 0.005" to 0.150" (5 mils to 150 mils or 0.10 mm to 4.0 mm), and more preferably in the range of about 0.01" to 0.075" (10 mils to 75 mils or 0.25 mm to 2.0 mm).

A preferable method of disposing the electrochemically active regions 60 to the PEM is to utilize the direct writing technique in a so-called decal method as is well known in the art. In the decal method, a slurry of catalyst coated carbon or graphite, polymer binder and casting solvent is applied evenly over a Teflon blank. The Teflon blank is then baked in an oven and subsequently hot-pressed to a membrane such as a PEM. The Teflon blank is then peeled from the membrane and the catalyst coated carbon or graphite remains embedded as a continuous electrode to the membrane to completely form a MEA.

For purposes of applying the electrochemically active regions of the present invention, the direct writing technique is used to apply a slurry of the electrochemically active material onto the Teflon blanks at the desired widths and thickness in the desired pattern for the electrochemically active regions. An exemplary slurry for purposes of the present invention may comprise, but should not be limited to about 4% platinum, 4% ionomer, 4% carbon, 19% isopropyl alcohol and 69% water. After the slurry has been disposed onto the Teflon blanks in the desired pattern, the blanks are oven dried at 80° C. for 5 minutes. The Teflon blanks are then hot pressed onto opposing surfaces of the PEM at a temperature of 146° C. and pressure of 400 psig. Subsequently, the Teflon blanks are removed and the electrochemically active material remains disposed on the PEM as the electrochemically active regions of the anode and cathode in the preferable pattern of stripe shaped regions or dot shaped regions, to form an MEA. It should be noted that the electrically conductive regions adjacent the electrochemically active regions may also be disposed in this way.

It should also be understood that although the above described method is preferable, the present invention should not be limited thereto. For example, a number of direct writing devices may be employed at the same time to dispose both the electrochemically active regions and the electrically conductive regions essentially simultaneously. Furthermore, it should be understood that depending on the varying amounts and constituents of the slurry, different pressures and temperatures may be needed for the baking and hot pressing steps. Another possible variation may be to deposit the electrochemically active regions and electrically conductive regions directly onto the PEM with the direct writing technique.

Moreover, although it is preferable to have a single electrochemically active region 60 disposed per channel 64, it is not out of the scope of the present invention to dispose a plurality of electrochemically active regions 60 per channel 64. If a plurality of electrochemically active regions 60 are disposed per channel 64, more catalytic areas will be present to thereby increase the rate of the electrochemical reaction.

Figure 7:
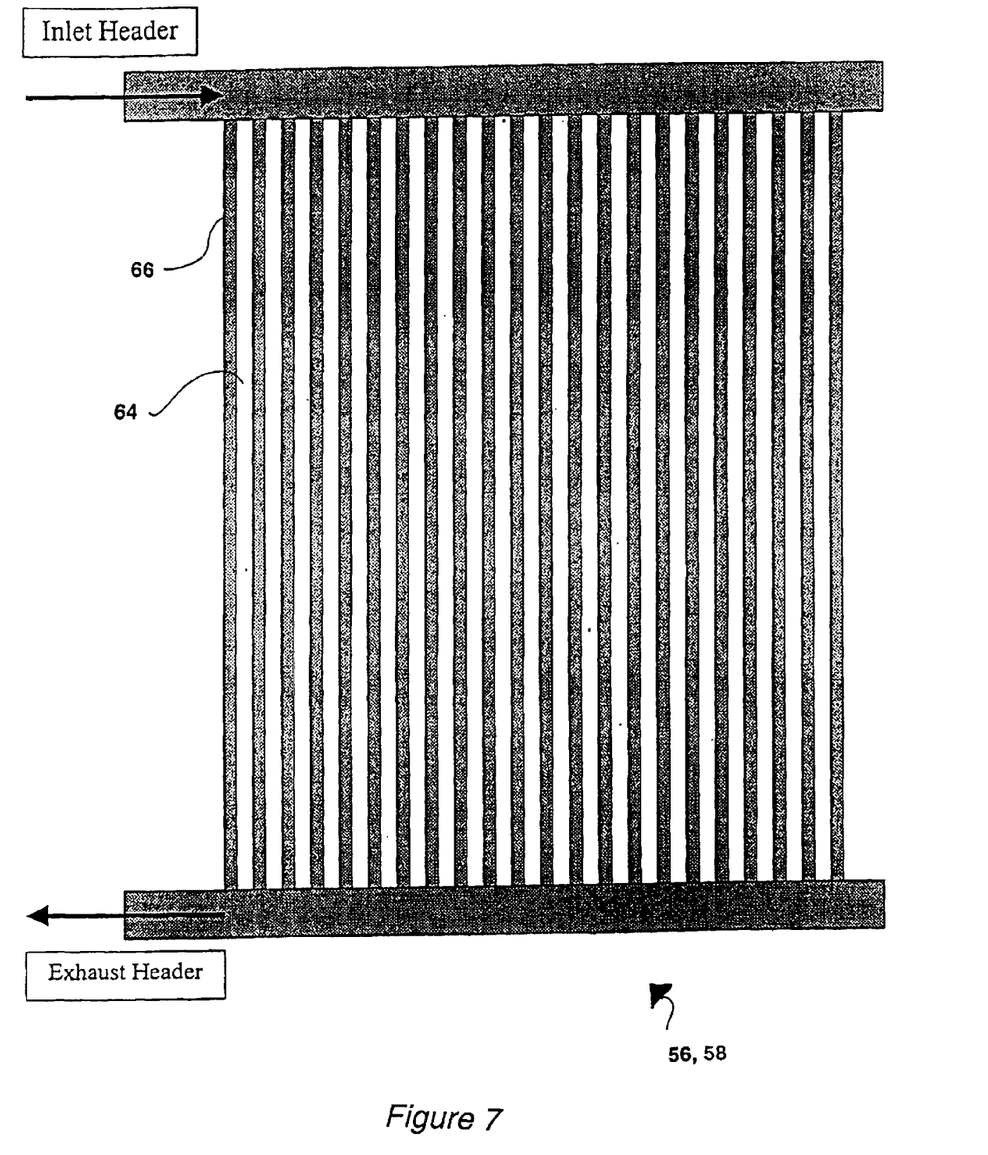
FIG. 7 is an overhead view of a simplified electrically conductive fluid distribution element used in accordance with the present invention.

Yet another unique advantage of the present invention one skilled in the art would readily appreciate is the simplification of the flow fields of the bipolar plates 56 and 58. As can be seen in FIG. 7, the lands 66 and channels 64 of the bipolar plates 56 and 58 are arranged in an array of straight channels, preferably vertical to aid in water removal from the fuel cell. This is due to the fact that the electrochemically active regions 60 are disposed to essentially match-up or align with the corresponding channels 64, thereby eliminating the gas diffusion media. Because the gas diffusion media have been eliminated, there is no longer a need to force flow the feed streams through a plurality of channels that meander in a serpentine or interdigitated configuration. Furthermore, because the pressure drop within individual channels 64 is much greater than within the headers, the flow of the reactant gases of the feed stream should be evenly split among the channels 64. Moreover, the flow uniformity can be optimized by varying the channel cross-sections across the array. Those nearest the header ports would be slightly smaller in cross-section than those farthest from the header ports. It should also be noted that a simplified flow field will greatly simplify the manufacture of the bipolar plates and reduce costs associated with their manufacture.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A membrane electrode assembly comprising:
   an ionically conductive member with a first surface; and
   a first electrode at said first surface,
   wherein said electrode comprises a plurality of active regions having electrochemically active material and ionically conductive polymeric material, and electrically conductive non-active regions disposed against said first surface of said ionically conductive member and dispersed between said active regions.

2. The membrane electrode assembly of claim 1, wherein said ionically conductive member is a proton exchange membrane and comprises the same ionically conductive polymeric material as is present in said electrochemically active regions.

3. The membrane electrode assembly of claim 1, further comprising a second electrode, wherein said second electrode is at a second surface of said ionically conductive member opposing said first surface.

4. The membrane electrode assembly of claim 3, wherein said first electrode is an anode and said second electrode is a cathode.

5. The membrane electrode assembly of claim 1, wherein each said active region is in the form of a stripe.

6. The membrane electrode assembly of claim 1, wherein said electrically conductive material is thermally conductive.

7. The membrane electrode assembly of claim 1, wherein said active regions and said non-active regions alternate.

8. The membrane electrode assembly of claim 1, wherein each of said active and non-active regions comprises an electrically conductive material in particle form.

9. A fuel cell comprising:
   an ionically conductive member having a first surface;
   a first electrode at said first surface of said ionically conductive member, and comprising a plurality of active regions having electrochemically active material; and
   an electrically conductive fluid distribution element facing said electrode and having a plurality of fluid passages respectively aligned with and facing said active regions and a plurality of lands disposed between said fluid passages respectively aligned with and facing said non-active regions.

10. The fuel cell according to claim 9, wherein said active regions are encompassed by said passages.

11. The fuel cell according to claim 9, wherein a plurality of active regions are encompassed by a passage.

12. The fuel cell according to claim 9, wherein said active regions are stripe-shaped.

13. The fuel cell according to claim 9, wherein said electrically conductive material is thermally conductive.

14. The fuel cell according to claim 9, wherein each said land is in electrically conductive contact with one or more of said non-active regions.

15. The fuel cell according to claim 9, wherein at least one of said active regions has a width less than a width of said respective passage.

16. The fuel cell according to claim 9, wherein at least one of said active regions has a width greater than a width of said respective passage.

17. The fuel cell according to claim 9, wherein said electrode further comprises a plurality of open areas adjacent said active regions.

18. The fuel cell according to claim 9, wherein each of said fluid passages comprises a channel facing said electrode having sidewalls that form an acute angle with said electrode.

19. The fuel cell according to claim 18, wherein said channel has a triangular-shaped cross section with an open end of said cross-section facing said active regions.

20. The fuel cell according to claim 19, wherein said sidewalls are curved at said open end of said triangular-shaped cross section to define a water accumulation zone.

21. A fuel cell comprising:
   an ionically conductive member with a first surface and a second surface;
   an anode electrode on said first surface of said ionically conductive member, said anode comprising a first group of spaced-apart electrochemically active regions having electrochemically active material, and electrically conductive non-active regions between said active regions;
   a cathode electrode on said second surface of said ionically conductive member, said cathode comprising a second group of spaced-apart electrochemically active regions, and open areas between said active regions; and
   a first electrically conductive fluid distribution element facing said anode and a second electrically conductive fluid distribution element facing said cathode;
   wherein said first and second electrically conductive fluid distribution elements comprise a plurality of fluid passages aligned with said respective active regions.

22. A method of forming an assembly comprising a membrane and an electrode, said membrane having a body defined by opposed surfaces and said method comprising: applying electrochemically active material onto at least two spaced-apart regions on one surface of said membrane body to form said electrode.

23. The method of claim 22 which further comprises applying electrically conductive material on said membrane between said spaced apart regions.

24. The method of claim 22 wherein said electrochemically active material is applied as elongate strips.

25. The method according to claim 22 wherein said electrochemically active material is applied through an orifice of a writing instrument.

26. The method of claim 22 wherein said applying is conducted by depositing said electrochemically active material onto a decal and then transferring from the decal to the membrane.

* * * * *